US012725340B2

(12) United States Patent
Wang et al.

(10) Patent No.: US 12,725,340 B2
(45) Date of Patent: Sep. 1, 2026

(54) METHOD, DEVICE, AND PROGRAM PRODUCT FOR GENERATING AVATAR ANIMATION

(71) Applicant: Dell Products L.P., Round Rock, TX (US)

(72) Inventors: Zijia Wang, London (GB); Jinpeng Liu, Shanghai (CN); Chunxi Chen, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 18/675,365

(22) Filed: May 28, 2024

(65) Prior Publication Data

US 2025/0329092 A1 Oct. 23, 2025

(30) Foreign Application Priority Data

Apr. 17, 2024 (CN) ......................... 202410468218.3

(51) Int. Cl.
*G06T 13/40* (2011.01)
*G06F 40/30* (2020.01)

(52) U.S. Cl.
CPC .............. *G06T 13/40* (2013.01); *G06F 40/30* (2020.01)

(58) Field of Classification Search
CPC ......... G06T 13/40; G06T 13/00; G06F 40/30; G06N 3/044; G06N 3/0475
See application file for complete search history.

(56) References Cited

U.S. PATENT DOCUMENTS

2017/0039750 A1* 2/2017 Tong ....................... G06T 13/40
2021/0248804 A1* 8/2021 Hussen Abdelaziz .. G06T 13/80
2022/0108510 A1* 4/2022 Sagar ...................... G10L 21/10

OTHER PUBLICATIONS

Ferstl, Ylva, and Rachel McDonnell. "Investigating the use of recurrent motion modelling for speech gesture generation." Proceedings of the 18th International Conference on Intelligent Virtual Agents. 2018. (Year: 2018).*

(Continued)

*Primary Examiner* — Daniel F Hajnik
*Assistant Examiner* — Chris Alejandro Puntier
(74) *Attorney, Agent, or Firm* — Ryan, Mason & Lewis, LLP

(57) ABSTRACT

A method in an illustrative embodiment includes generating an animation instruction vector for an avatar animation based on input text. The method further includes determining an animation sequence of the avatar animation based on the animation instruction vector, where the animation sequence indicates multiple frames of the avatar animation and transitions between the multiple frames. The method further includes determining a facial blended shape of the avatar animation based on the animation instruction vector, where the facial blended shape indicates a facial expression of the avatar animation. In addition, the method further includes generating an avatar animation corresponding to the input text based on the animation sequence and the facial blended shape. In this way, the input text can be accurately understood, so that a more natural and smooth coherent animation with rich facial expression details can be generated, thereby further improving the user experience.

20 Claims, 7 Drawing Sheets

(56) References Cited

OTHER PUBLICATIONS

Liu, Zhilei, et al. "Conditional Adversarial Synthesis of 3D Facial Action Units." arXiv preprint arXiv:1802.07421 (2018). (Year: 2018).*
J. Cassell et al., "Animated Conversation: Rule-based Generation of Facial Expression, Gesture & Spoken Intonation for Multiple Conversational Agents," Proceedings of the 21st Annual Conference on Computer Graphics and Interactive Techniques, Jul. 1994, 8 pages.
H. Tibebu et al., "Text to Image Synthesis using Stacked Conditional Variational Autoencoders and Conditional Generative Adversarial Networks," Intelligent Computing: Proceedings of the 2022, Computing Conference, Jul. 2022, 17 pages.
N. Sadoughi et al., "Speech-Driven Animation with Meaningful Behaviors," arXiv: 1708.01640v1, Aug. 4, 2017, 13 pages.
A. S. Lin et al., "Generating Animated Videos of Human Activities from Natural Language Descriptions," Proceedings of the Visually Grounded Interaction and Language Workshop, Dec. 2018, 7 pages.
W. Xu, "Stylistic Dialogue Generation Based on Character Personality in Narrative Films," PhD. Thesis in Science and Technology at Bournemouth University, Nov. 2022, 219 pages.
C. Pelachaud, "Modelling Multimodal Expression of Emotion in a Virtual Agent," Philosophical Transactions of the Royal Society B, vol. 364, No. 1535, Dec. 12, 2009, pp. 3539-3548.

* cited by examiner

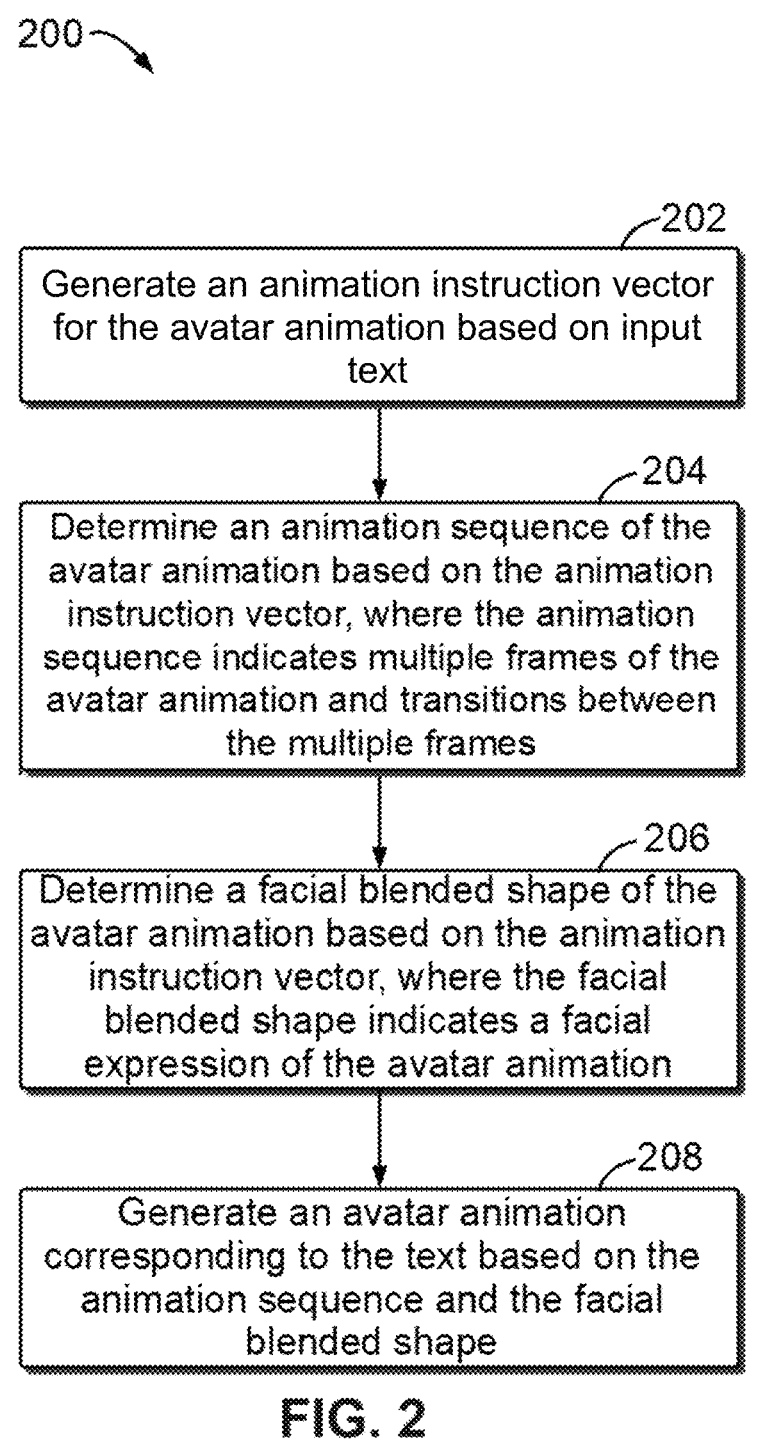

200

202
Generate an animation instruction vector for the avatar animation based on input text 204
Determine an animation sequence of the avatar animation based on the animation instruction vector, where the animation sequence indicates multiple frames of the avatar animation and transitions between the multiple frames 206
Determine a facial blended shape of the avatar animation based on the animation instruction vector, where the facial blended shape indicates a facial expression of the avatar animation 208
Generate an avatar animation corresponding to the text based on the animation sequence and the facial blended shape

FIG. 2

METHOD, DEVICE, AND PROGRAM PRODUCT FOR GENERATING AVATAR ANIMATION

RELATED APPLICATION

The present application claims priority to Chinese Patent Application No. 202410468218.3, filed Apr. 17, 2024, and entitled "Method, Device, and Program Product for Generating Avatar Animation," which is incorporated by reference herein in its entirety.

FIELD

The present disclosure relates generally to the field of computers, and more particularly, to a method, an electronic device, and a product for generating an avatar animation.

BACKGROUND

Avatar animation refers to a process of creating and animating virtual characters by technical means. These virtual characters, often called "avatars," can be used in various applications. In the process of making an avatar animation, first the appearance of the avatar is designed and modeled, including its shape, clothing, facial features, and the like. Then, an animator adds actions and expressions to the avatars, so that they can present realistic dynamic effects. These actions and expressions can be realized by key frame animation, motion capture, and other techniques.

Avatar animation is coming into widespread use in more industries and applications. In the game industry, sophisticated avatar animation can enhance the immersion feeling and game experience of a player; in film and television production, avatar animation can be used to create special-effect characters or achieve actions that actors cannot do; and in virtual reality and augmented reality applications, avatar animation can provide users with a more realistic and personalized virtual experience.

SUMMARY

Embodiments of the present disclosure provide a method, device, and computer program product for generating an avatar animation.

In a first aspect of embodiments of the present disclosure, a method is provided. The method includes generating an animation instruction vector for an avatar animation based on input text. The method further includes determining an animation sequence of the avatar animation based on the animation instruction vector, where the animation sequence indicates multiple frames of the avatar animation and transitions between the multiple frames. The method further includes determining a facial blended shape of the avatar animation based on the animation instruction, where the facial blended shape indicates a facial expression of the avatar animation. In addition, the method further includes generating an avatar animation corresponding to the input text based on the animation sequence and the facial blended shape.

In a second aspect of embodiments of the present disclosure, an electronic device is provided. The electronic device includes at least one processor and a memory coupled to the at least one processor and having instructions stored therein, wherein the instructions, when executed by the at least one processor, cause the electronic device to perform actions. The actions include generating an animation instruction vector for an avatar animation based on input text. The actions further include determining an animation sequence of the avatar animation based on the animation instruction vector, where the animation sequence indicates multiple frames of the avatar animation and transitions between the multiple frames. The actions further include determining a facial blended shape of the avatar animation based on the animation instruction vector, where the facial blended shape indicates a facial expression of the avatar animation. In addition, the actions include generating an avatar animation corresponding to the input text based on the animation sequence and the facial blended shape.

In a third aspect of embodiments of the present disclosure, a computer program product is provided. The computer program product is tangibly stored on a non-transitory computer-readable medium and comprises machine-executable instructions which, when executed by a machine, cause the machine to perform actions. The actions include generating an animation instruction vector for an avatar animation based on input text. The actions further include determining an animation sequence of the avatar animation based on the animation instruction vector, where the animation sequence indicates multiple frames of the avatar animation and transitions between the multiple frames. The actions further include determining a facial blended shape of the avatar animation based on the animation instruction vector, where the facial blended shape indicates a facial expression of the avatar animation. In addition, the actions include generating an avatar animation corresponding to the input text based on the animation sequence and the facial blended shape.

It should be understood that the content described in this Summary is neither intended to define key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which:

FIG. 2 is a flow chart of a method for generating an avatar animation according to some embodiments of the present disclosure;

DETAILED DESCRIPTION

Figure 1:
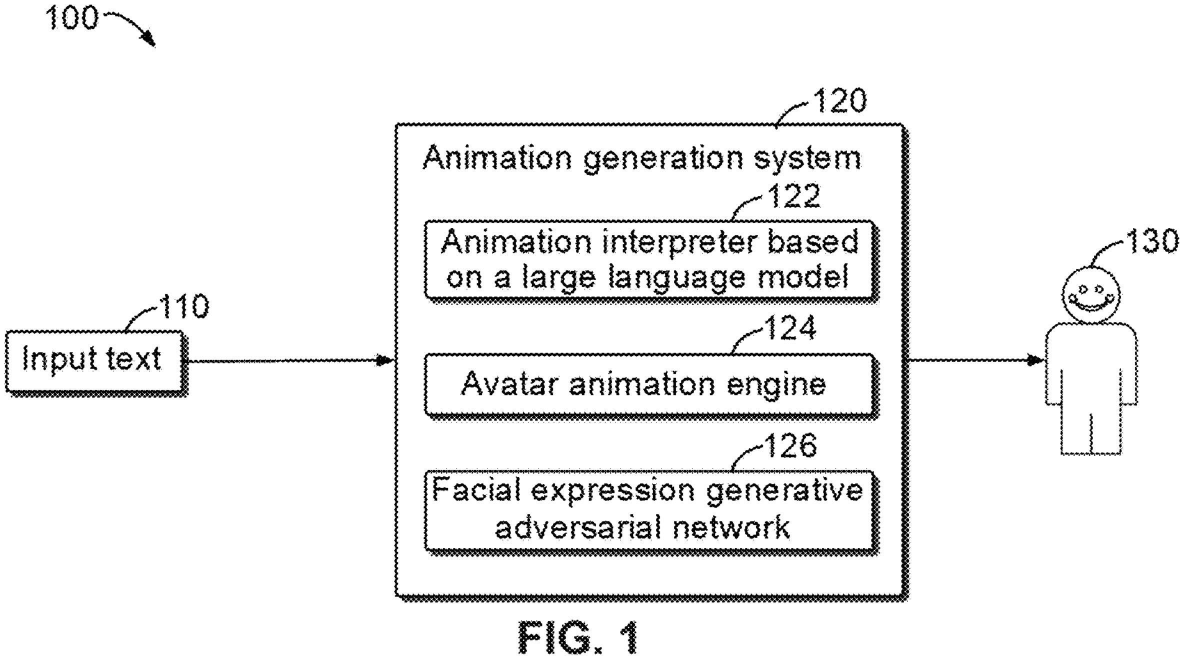
FIG. 1 is a schematic diagram of an example environment in which multiple embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to."The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Making avatar animation characters based on input text is a challenging task, which requires capturing nuances, emotions, and contexts in the text and transforming them into vivid, coherent, and situational avatar animations. Traditional methods rely on manually formulated rules, predefined templates, or limited data sets. Rule-based methods map input text to animation parameters, such as facial expressions, gestures, and body movements, using manually formulated rules. However, the rule-based methods are limited by the expressiveness and diversity of predefined rules, and may not cover all possible input text scenarios and changes. Template-based methods use predefined templates or scripts to generate animations based on input text. However, the template-based methods are limited by the availability and quality of templates, which may not match the style and context of the input text.

In view of this, embodiments of the present disclosure provide a solution for generating an avatar animation. In some embodiments of the present disclosure, first, a piece of text is input, and this text is to be used by the system to generate action instruction vectors of the avatar animation. Then, the system determines a series of actions of the avatar animation according to these instruction vectors. These actions include many different postures of the avatar animation and the process of transformation from one posture to another. In this way, a new animation sequence can be obtained. Meanwhile, the system also determines the facial expression of the avatar animation according to these animation instruction vectors. Finally, the system combines these action sequences with facial expressions to generate a complete avatar animation. This avatar animation makes corresponding actions and expressions according to the input text.

In this way, the content of the input text can be understood more accurately so as to create a more natural and smooth animation sequence. Meanwhile, the animation with delicate and coherent facial expressions can be generated, which greatly enhances the vividness and lifelikeness of the generated avatar animation, thus improving the user experience.

FIG. 1 is a schematic diagram of an example environment 100 in which multiple embodiments of the present disclosure can be implemented. As shown in FIG. 1, a generated avatar animation 130 can be obtained from an input text 110 through an animation generation system 120. The generated avatar animation 130 is the avatar animation corresponding to the input text 110. For example, the input text is "He jumps up happily." After being processed by the animation generation system 120, an avatar animation can be generated, in which the facial expression is a smile and the feet jump off the ground. The facial expression may have more facial details, such as the facial expression details with slightly narrowed eyes and raised mouth corners. The animation generation system 120 includes an animation interpreter 122 based on a Large Language Model (LLM), an avatar animation engine 124, and a facial expression generative adversarial network 126.

In some embodiments, the animation interpreter 122 based on a large language model can be used to generate animation instruction vectors. For example, when the input text is "He jumps up happily," it can generate animation instruction vectors indicating [expression: smile; body movement: feet jumping off the ground]. In some embodiments, the avatar animation engine 124 may be used to generate a specific animation sequence. For example, for said animation instruction vectors indicating [expression: smile; body movement: feet jumping off the ground], the avatar animation engine 124 can output a coherent jumping animation sequence, in which the expression on the face is a smile. In some embodiments, the facial expression generative adversarial network 126 can generate facial expression details with slightly narrowed eyes and raised mouth corners for the animation instruction vector indicating [expression: smile]. In some embodiments, by combining the generated facial expression details with the generated coherent jumping animation sequence, a coherent generated avatar animation 130 with vivid expressions corresponding to the input text "He jumps up happily" can be generated.

FIG. 2 is a flow chart of a method 200 for generating an avatar animation according to some embodiments of the present disclosure. In block 202, an animation instruction vector for the avatar animation is generated based on input text. In some embodiments, the animation interpreter 122 based on a large language model can be used to generate animation instruction vectors. For example, when the input text is "He jumps up happily," it can generate animation instruction vectors indicating [expression: smile; body movement: feet jumping off the ground].

In block 204, an animation sequence of the avatar animation is determined based on the animation instruction vector, where the animation sequence indicates multiple frames of the avatar animation and transitions between the multiple frames. Animation sequence refers to a series of consecutive pictures arranged in a specific order and frame rate in animation production to form a smooth dynamic image. In some embodiments, the avatar animation engine 124 can be used to generate a specific animation sequence. For example, for the animation instruction vectors indicating [expression: smile; body movement: feet jumping off the ground], the avatar animation engine 124 can output such an animation sequence: at first, the avatar animation character stands on the ground, and the facial expression of the character is relaxed and happy; ready to jump, the avatar animation character begins to bend his knees and his body sinks slightly to prepare for jumping; jumping up, the avatar animation character suddenly slammed on the ground and the body rose rapidly; and air posture, in the air, the body of the character remains stretched and his arms may open upward.

In block 206, a facial blended shape of the avatar animation is determined based on the animation instruction vector, where the facial blended shape indicates a facial expression of the avatar animation. For the facial blended shape, the face area can be separated into different parts, such as eyes, eyebrows, nose, mouth, etc., and a series of preset shapes are created for each part. In some embodiments, the facial expression generative adversarial network 126 can generate facial expression details with slightly narrowed eyes and raised mouth corners for the animation instruction vector indicating [expression: smile].

In block 208, an avatar animation corresponding to the text is generated based on the animation sequence and the facial blended shape. In some embodiments, the generated animation sequence can be fused with facial expression details at corresponding instants to generate a coherent avatar animation with rich facial expression details.

By analyzing the semantics of the input text to generate a coherent animation sequence, and combining it with the facial blended shape technique, the system can deeply understand the content of the input text and create a more natural and smooth avatar animation on this basis. This method not only makes the overall rhythm and action transition of the avatar animation more harmonious, but also ensures the coherence of plot development, bringing more comfortable visual enjoyment to a user. Meanwhile, with the help of the facial blended shape technique, the coherent animation effect with delicate facial expressions can be generated, which enhances the vividness and lifelikeness of the generated avatar animation, thus further improving the user experience.

Figure 3:
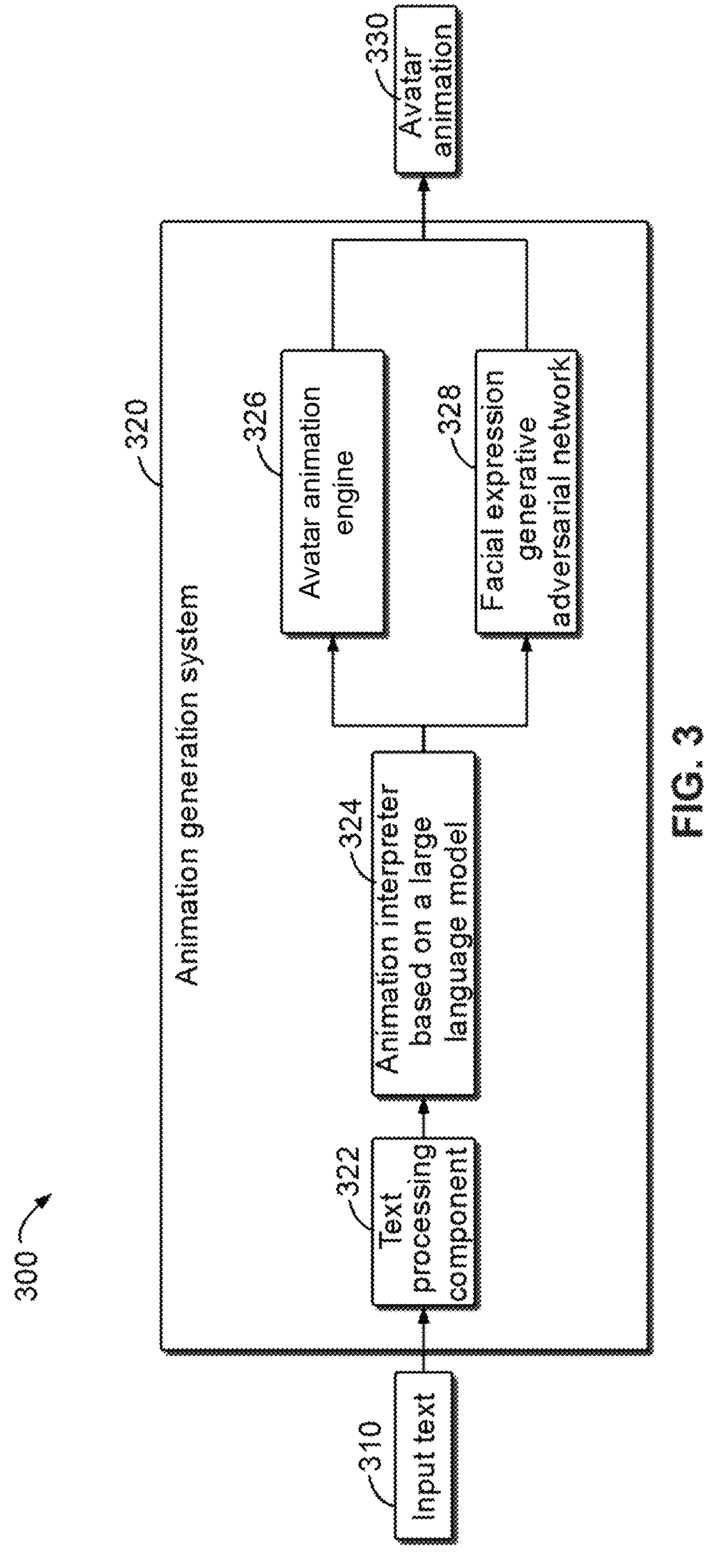
FIG. 3 is a schematic diagram of generating an avatar animation based on an avatar animation system according to some embodiments of the present disclosure.

FIG. 3 is a schematic diagram of generating an avatar animation based on an avatar animation system 300 according to some embodiments of the present disclosure. As shown in FIG. 3, an avatar animation 330 corresponding to an input text 310 can be obtained from the input text through an animation generation system 320. Referring to FIG. 3, the input text 310 can be processed by a text processing component 322 to obtain emotional features or contextual features. The text processing component 322 is the initial module of the system, which is mainly responsible for parsing and understanding the input text. It uses natural language processing (NLP) techniques to analyze the emotion, mood, and intention of the text, laying the foundation for creation of an accurate avatar animation. During processing, the text processing component 322 performs a series of complex operations, including lexical analysis, syntactic analysis, semantic understanding, and the like, to extract key information and features from the text. These features include not only the meaning of words, phrases, and sentences, but also the emotional tendency and emotional intensity expressed by the text and the intention behind them. Specifically, Equation (1) below represents the process of natural language processing of the input text T by the text processing component 322, and the output result is E, where E represents the emotional and contextual features extracted from the input text T, which serve as an important basis for subsequent animation creation:

$$E = NLP(T) \tag{1}$$

For example, if the text of the input text 310 is "She jumps up happily," the text processing component 322 can recognize that the feature is "happy" and can pass this emotional feature to the subsequent animation interpreter 324 to generate an avatar animation expressing happy emotions. In some embodiments, the text processing component 322 can process the input long text into a short text, so that an animation interpreter 324 based on a large language model can better understand the input text 310.

By accurately extracting and analyzing these features, the text processing component 322 can provide strong support for the subsequent animation sequence design and facial blended shape generation, which makes the generated avatar animation closer to the text content and realizes more accurate expression of emotions and actions, thus improving the quality of the whole avatar animation work and further improving the user experience.

Figure 4:
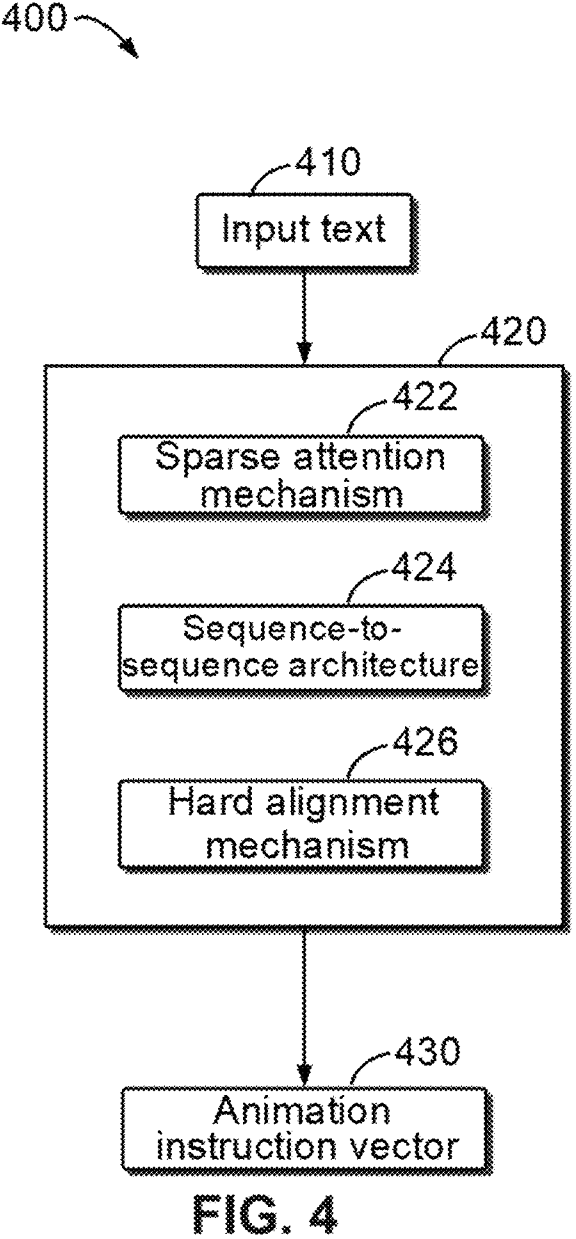
FIG. 4 is a schematic diagram of determining an animation instruction vector according to some embodiments of the present disclosure.

With continued reference to FIG. 3, an animation instruction vector corresponding to the input text 310 can be obtained by inputting the input text 310 to the animation interpreter 324 based on a large language model. A schematic diagram 400 of determining an animation instruction vector 430 according to some embodiments of the present disclosure will be described below with reference to FIG. 4. The architecture of the animation interpreter 324 based on a large language model shown in FIG. 3 is illustratively shown as animation interpreter 420 in FIG. 4. Referring to FIG. 4, the animation interpreter 420 based on a large language model adopts a sequence-to-sequence (seq2seq) architecture 424, and includes a sparse attention mechanism 422 in combination with a hard alignment retrieval mechanism 426 in a preset animation instruction library, so that fine mapping from text to animation can be realized.

In some embodiments, the animation parameters of the current instant can be determined according to the animation parameters of the previous instant and the emotional features of the previous instant. Specifically, as shown in Equation (2):

$$A_t = LLM(E_{t-1}, A_{t-1}) \tag{2}$$

Assume that there is an input text 410 "She smiles happily," in which $A_t$ represents the animation state parameter or animation instruction of the current time step (i.e., the instant of "smiling"), representing the animation parameter of her smiling face. $E_{t-1}$ contains the emotional and contextual feature information of the description "She happily," which is the feature vector of the previous time step. $A_{t-1}$ is the animation state of the previous instant, such as the animation parameters when her expression is calm or she starts to smile. According to this input information, the large-scale language model predicts and generates the animation state $A_t$ of the current time step, that is, the animation parameters of the specific animation expression of her happy smile. In some embodiments, $A_t$ is in the form of a series of numerical sequence codes.

In some embodiments, assume that there is the input text 410 "She smiles happily." It can be recognized by the sparse attention mechanism 422 of the large language model that "happily" and "smiles" are the most significant parts of this text, because they directly describe the emotions and actions. Therefore, the sparse attention mechanism mainly focuses on this part of the content and assigns it a higher weight. The weight calculation in the sparse attention mechanism is shown in Equation (3) as follows:

$$a_{ij} = \frac{\exp(\mathrm{Score}(h_i, h_j))}{\sum_{k \in Selected} \exp(\mathrm{Score}(h_i, h_k))} \tag{3}$$

For the sentence "She smiles happily," the sparse attention mechanism concerns the words most correlated with the smile. In this example, "happy" and "smiles" can be the selected words. $h_i$ and $h_j$ represent the hidden states of the words "happy" and "smiles" respectively. Score $(h_i, h_j)$ calculates the correlation between these two words and measures their significance in emotional expression and action. Due to the characteristics of sparse attention, only the words in the word set Selected are of concern. Then, for these words, their attention weights $\alpha_{ij}$ are calculated, which determine their relative significance in animation generation. Through this sparse attention mechanism, the calculation load of the system can be reduced, thus improving the efficiency of functioning of the system.

Based on these text parts of concern, the large language model can generate corresponding animation instruction vectors 430. In this example, it may generate animation parameters correlated with the "happy" emotion (such as the smiling expression on the face of the character) and animation parameters correlated with the action of "smiling" (such as the movement track of the head of the character).

In some embodiments, in order to avoid errors in the animation instructions generated by the large language model, the key information in the text can be accurately matched with the pre-stored animation instructions by the hard alignment mechanism 426. As shown in Equation (4):

$$A_{seq} = Seq2Seq(T_{input}, H_{align}) \tag{4}$$

Assume there is the input text 410 "She jumps up happily," where $T_{input}$ is the sentence "She jumps up happily," and $H_{align}$ is the hard-aligned animation instruction corresponding to this text pattern, that is, the general animation instruction of character jumping. The Seq2Seq model combines the input text $T_{input}$ with the hard-aligned information $H_{align}$ to generate the animation instruction sequence $A_{seq}$, where $A_{seq}$ includes the $A_t$ parameters at all instants. This animation instruction sequence describes in detail the whole process from her standing to jumping up. In some embodiments, $A_{seq}$ may exist in the form of vectors.

In some embodiments, the animation generation system 320 has pre-stored some animation instructions corresponding to specific text patterns. For example, for the word "smile," there can be a pre-stored animation instruction, which describes the whole process of the character from an expressionless face to a smiling face. When the seq2seq model encounters the word "smile," it retrieves the pre-stored animation instruction and hard-codes it into the generated animation instruction.

This architecture fully utilizes the robust capability of a large-scale language model, and can analyze the nuances in the text and accurately convert them into animation instructions. In this way, by combining the sparse attention mechanism with the seq2seq architecture with hard alignment, the content of the text can be understood more accurately and an animation instruction vector that is highly matched with the text can be generated.

Returning to FIG. 3, an animation instruction vector corresponding to the input text 310 can be generated by the animation interpreter 324 based on a large language model. For example, if the input text 310 is "He jumps up happily," the animation interpreter 324 based on a large language model can output animation instruction vectors indicating [expression: smile; body movement: feet jumping off the ground]. The animation instruction vectors are input to the avatar animation engine 326 to generate an animation sequence corresponding to the animation instruction vectors. The animation sequence includes frame-by-frame images and the transformation relationship between the images.

Figure 5:
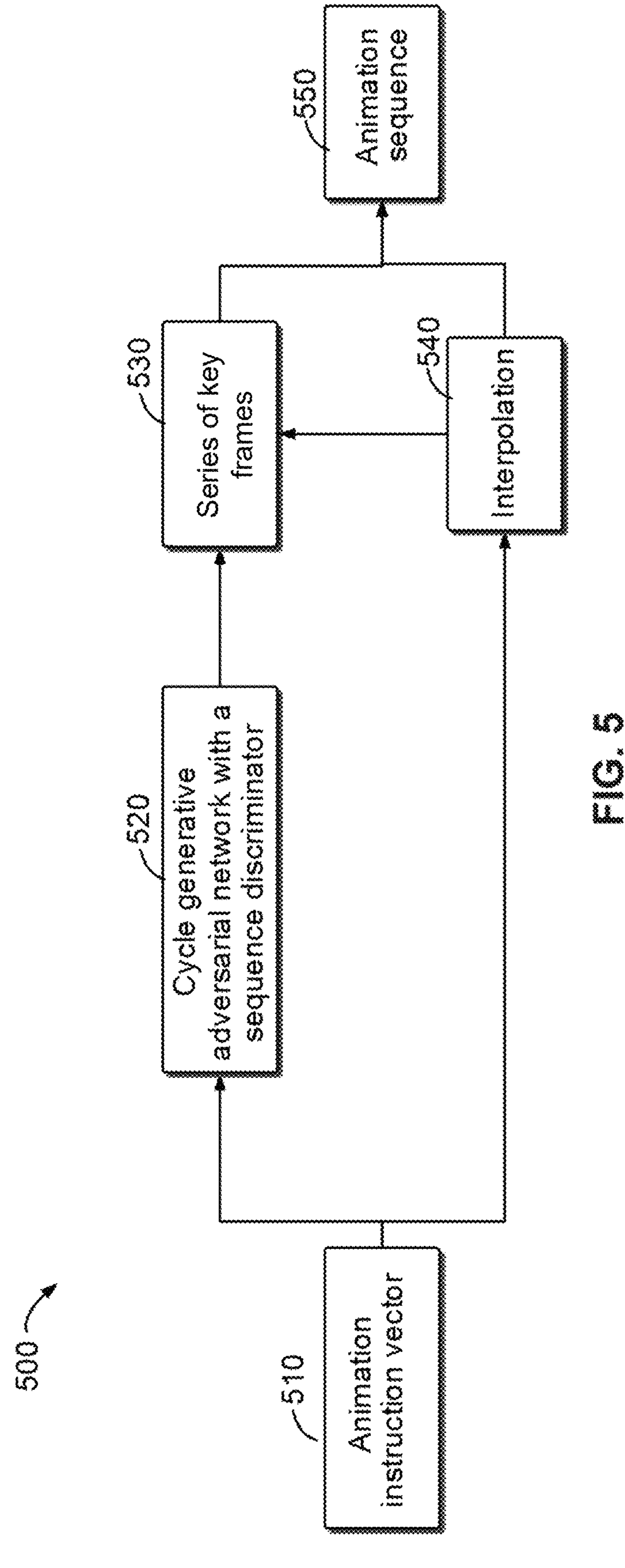
FIG. 5 is a schematic diagram of determining an animation sequence according to some embodiments of the present disclosure.

A schematic diagram of determining an animation sequence according to some embodiments of the present disclosure will be described below with reference to FIG. 5. FIG. 5 shows a schematic diagram 500 of determining an animation sequence according to some embodiments of the present disclosure. Referring to FIG. 5, an animation instruction vector 510 in the form of a vector generated by the animation interpreter is input to a cycle generative adversarial network (cycleGANseq) 520 with a sequence discriminator to generate a series of key frames 530, where the key frames illustratively comprise respective images. In order to ensure that the generated series of key frames 530 are coherent and can be dynamically changed, the generated series of key frames 530 can be interpolated 540, so that the avatar animation engine 326 can generate a dynamic and coherent animation sequence 550.

Alternatively, in the process of generating the animation sequence 550, the cycle generative adversarial network can be used to generate the key frame of each current time step. Specifically, as shown in Equation (5):

$$M_t = \text{Cycle}GAN(A_t, M_{t-1}) \tag{5}$$

where $A_t$ is the animation parameter of the current time step, and $M_{t-1}$ is the animation movement key frame of the previous time step.

With continued reference to FIG. 5, in some embodiments, instead of evaluating each frame individually, the cycle generative adversarial network 520 with a sequence discriminator evaluates the whole animation sequence. This ensures that the generated animation sequence is not only reasonable in each frame, but also consistent and smooth in the whole sequence. In this way, the system can generate a coherent and natural animation sequence. Specifically, as shown in Equation (6):

$$M_{seq} = \text{Cycle}GAN_{seq}(A_{seq}) \tag{6}$$

where $A_{seq}$ is an input animation instruction set vector which contains text or parameter information describing the actions, expressions, position changes and the like of a character. $\text{CycleGAN}_{seq}$ is a modified CycleGAN model which generates the corresponding animation sequence $M_{seq}$ according to the input animation instructions. This motion sequence $M_{seq}$ is a consecutive action set which describes the motion trajectory and changing key frame images of the avatar animation character in the whole animation process. In this way, the system can generate an animation sequence that meets the requirements of the input instruction set.

In some embodiments, the loss between the real series of key frames and the generated series of key frames can be used to adjust the parameters of the cycle generative adversarial network 520 with a sequence discriminator.

In some embodiments, for the animation instruction vectors indicating [expression: smile; body movement: feet jumping off the ground], in order to ensure that the generated series of key frames 530 are a coherent animation sequence of smiling and jumping, an interpolation action can be performed on the generated series of key frames 530. Specifically, the interpolation is illustratively performed in accordance with Equation (7) as follows:

$$M_t = \text{Interpolate}(M_{t-1}, M_{t+1}) \quad (7)$$

where $M_{t-1}$ is the previous key frame, $M_t$ is the inserted key frame, and $M_{t+1}$ is the next key frame. For example, if an avatar animation character transitions from a standing state to a jumping state, the interpolation 540 calculates every intermediate posture of the avatar animation character between standing and jumping, thus generating a consecutive and smooth animation sequence. For example, for the instruction [expression: smile; body movement: feet jumping off the ground], through the cycle generative adversarial network 520 with a sequence discriminator and the interpolation 540, a coherent animation sequence of jumping with a smiling facial expression can be generated. In this way, the avatar animation engine can generate more natural and smoother actions that match the description of the input text, thus enhancing the lifelikeness and expressiveness of the animation.

Figure 6:
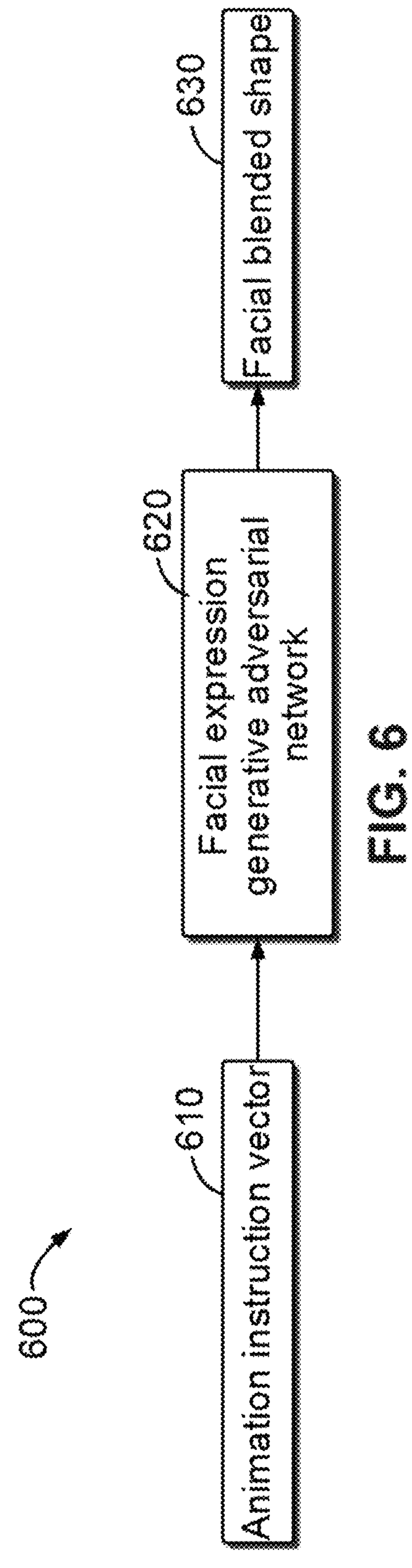
FIG. 6 is a schematic diagram of determining a facial blended shape according to some embodiments of the present disclosure.

Returning to FIG. 3, an animation instruction vector corresponding to the input text 310 can be generated by the animation interpreter 324 based on a large language model. For example, if the input text 310 is "He jumps up happily," the animation interpreter 324 based on a large language model can output animation instruction vectors indicating [expression: smile; body movement: feet jumping off the ground]. The animation instruction vectors are input to the facial expression generative adversarial network 328 to generate facial expression details corresponding to the animation instruction. A schematic diagram for determining a facial blended shape according to some embodiments of the present disclosure will be described below with reference to FIG. 6. FIG. 6 is a schematic diagram 600 of determining a facial blended shape according to some embodiments of the present disclosure. Referring to FIG. 6, an animation instruction vector 610 is input to a facial expression generative adversarial network 620, and a facial blended shape 630 correlated with the instruction can be obtained. Specifically, as shown in Equation (8):

$$F_t = GAN_{face}(E_t) \quad (8)$$

where $F_t$ represents the facial blended shape parameter at the time t, and $E_t$ is the emotional feature vector. The facial expression generative adversarial network 328 is a generative adversarial network dedicated for editing the facial blended shape that generates corresponding blended shape parameters according to the input emotional feature vectors. The blended shape is a technique for representing facial expressions in computer graphics, which creates complex facial expressions by combining different basic shapes (i.e., blended shapes). Emotional feature vectors contain emotional information extracted from the input text, such as happiness, sadness, anger, and the like.

In some embodiments, for the emotional feature vector indicating [expression: smile] in the animation instruction vectors indicating [expression: smile; body movement: feet jumping off the ground], facial expression details with slightly narrowed eyes and raised mouth corners can be generated. In this way, the system can generate a lifelike and natural facial expression that matches the text description, improving the emotional expression capability and interactive experience of a virtual character.

Returning to FIG. 3, after the animation instruction vector generated by the animation interpreter 324 based on a large language model is input to the avatar animation engine 326 and the facial expression generative adversarial network 328, a coherent and dynamically changing animation sequence and a face with facial expression details can be obtained respectively, and then the two can be fused at corresponding instants to obtain the coherent and consistent avatar animation 330 with lifelike expression details. Specifically, as shown in Equation (9):

$$\text{Avatar}_{animation} = \text{Integrate}(M_t, F_t) \quad (9)$$

where $\text{Avatar}_{animation}$ represents the final avatar animation character, $M_t$ is the body movement at the instant t, which contains the image of the body posture and action of the avatar animation character at that instant, and $F_t$ is the facial expression at the same instant, which represents the emotional state and emotional expression of the avatar animation character at that instant. This process involves the synchronization of the two in timing, rhythm, and expression, so as to ensure that they can show the behavior and emotion of the virtual character in harmony and consistency. By providing highly lifelike and attractive avatar animation characters, this system can improve the interactive experience of users, enhance the immersion feeling of virtual worlds, and bring more vivid and expressive visual effects to applications in various fields.

Figure 7:
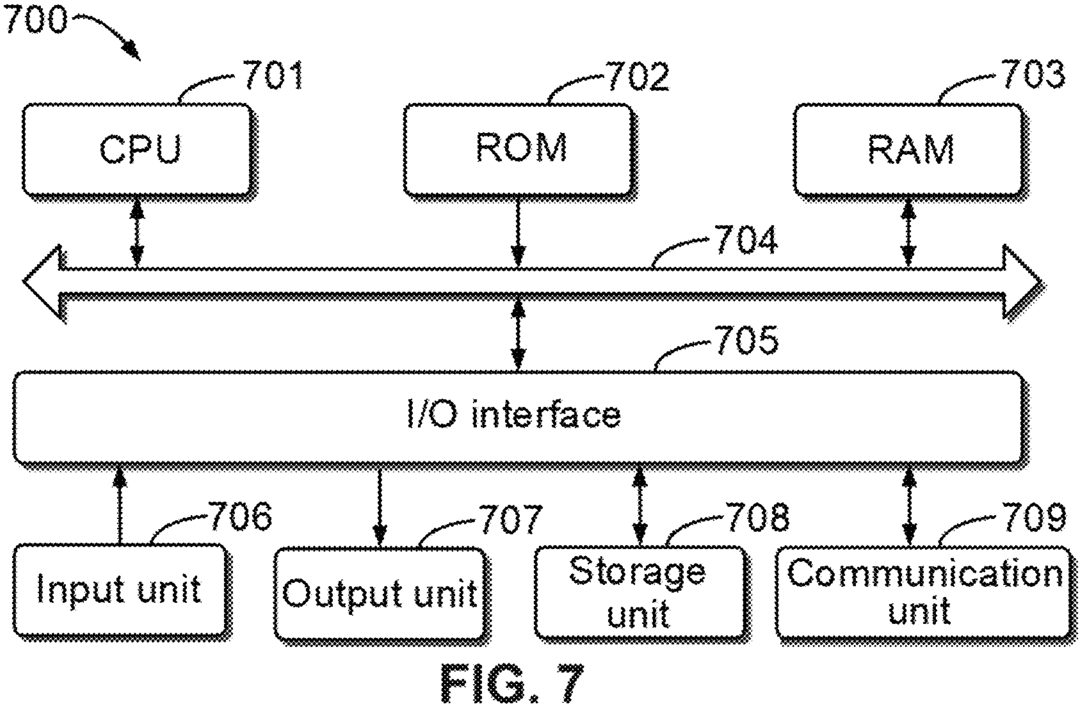
FIG. 7 is a block diagram of a device that can implement multiple embodiments of the present disclosure.

FIG. 7 is a block diagram of an example device 700 which can be used to implement embodiments of the present disclosure. As shown in the figure, the device 700 includes a computing unit 701, illustratively comprising at least one central processing unit (CPU), that can perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The computing unit 701, the ROM 702, and the RAM 703 are connected to each other via a bus 704. An Input/Output (I/O) interface 705 is also connected to the bus 704.

Multiple components in the device 700 are connected to the I/O interface 705, including: an input unit 706, such as a keyboard and a mouse; an output unit 707, such as various types of displays and speakers; the storage unit 708, such as a magnetic disk, an optical disc, and the like; and a communication unit 709, such as a network card, a modem, and a wireless communication transceiver. The communication unit 709 allows the device 700 to exchange information/data with other devices via a computer network, such as the Internet, and/or various telecommunication networks.

The computing unit 701 may be various general-purpose and/or special-purpose processing components with processing and computing powers. Some examples of the computing unit 701 include, but are not limited to, the above-noted one or more CPUs, graphics processing units (GPUs), various specialized artificial intelligence (AI) computing chips, various computing units for running machine learning model algorithms, digital signal processors (DSPs), and any appropriate processors, controllers, microcontrollers, and the like. The computing unit 701 performs various methods and processes described above, such as the method 200. For example, in some embodiments, the method 200 may be implemented as a computer software program that is tangibly included in a machine-readable medium such as the storage unit 708. In some embodiments, part or all of the computer program may be loaded and/or installed onto the device 700 via the ROM 702 and/or the communication unit 709. When the computer program is loaded to the RAM 703 and executed by the computing unit 701, one or more steps of the method 200 described above can be performed. Alternatively, in other embodiments, the computing unit 701 may be configured to perform the method 200 in any other suitable manners (such as by means of firmware).

The functions described herein may be performed at least in part by one or more hardware logic components. For example, without limitation, example types of available hardware logic components include: a field programmable gate array (FPGA), an application specific integrated circuit (ASIC), an application specific standard product (ASSP), a system on chip (SOC), a complex programmable logic device (CPLD), and the like.

Program codes for implementing the method of the present disclosure may be written by using one programming language or any combination of multiple programming languages. The program codes may be provided to a processor or controller of a general purpose computer, a special purpose computer, or another programmable data processing apparatus, such that the program codes, when executed by the processor or controller, implement the functions/operations specified in the flow charts and/or block diagrams. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, this should not be construed as an indication that such operations are required to be performed in the particular order shown or in a sequential order, or that all illustrated operations should be performed to achieve desirable results. In certain environments, multitasking and parallel processing may be advantageous. Likewise, although the above discussion contains several specific implementation details, these are not to be construed as limitations to the scope of the present disclosure. Certain features that are described in the context of separate embodiments may also be implemented in combination in a single implementation. In contrast, various features that are described in the context of a single implementation may also be implemented in multiple implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for generating an avatar animation, comprising:

generating an animation instruction vector for the avatar animation based on input text, by applying the input text to a large language model with a sparse attention mechanism, the large language model being configured to generate the animation instruction vector based on features of the input text;

determining an animation sequence of the avatar animation based on the animation instruction vector, the animation sequence indicating multiple frames of the avatar animation and transitions between the multiple frames;

determining a facial blended shape of the avatar animation based on the animation instruction vector, the facial blended shape indicating a facial expression of the avatar animation; and generating an avatar animation corresponding to the input text based on the animation sequence and the facial blended shape.

2. The method according to claim 1, wherein generating an animation instruction vector for the avatar animation based on input text comprises:

determining an animation instruction at a second instant based on emotional features and contextual features at a first instant of the input text and the animation instruction at the first instant.

3. The method according to claim 2, wherein determining an animation instruction at a second instant based on emotional features and contextual features at a first instant of the input text and the animation instruction at the first instant comprises:

determining, by the large language model with the sparse attention mechanism, emotional features and contextual features of the input text based on the input text; and determining the animation instruction based on the emotional features and the contextual features.

4. The method according to claim 3, wherein determining the animation instruction based on the emotional features and the contextual features comprises:

determining, by a hard alignment mechanism, the animation instruction corresponding to the input text based on a predefined animation instruction library.

5. The method according to claim 4, further comprising:

generating an animation instruction vector of the animation instructions based on a sequence-to-sequence of the large language model, the animation instructions in the animation instruction vector being arranged according to a time sequence.

6. The method according to claim 3, wherein determining an animation sequence of the avatar animation based on the animation instruction vector comprises:

generating, by a cycle generative adversarial network with a sequence discriminator, a series of key frames based on the animation instruction vector; and interpolating between a first key frame and a second key frame among the series of key frames to generate the animation sequence.

7. The method according to claim 6, further comprising:

adjusting the cycle generative adversarial network with a sequence discriminator based on a loss between real series of key frames and the generated series of key frames.

8. The method according to claim 6, further comprising:

determining an animation sequence at a third instant based on the animation sequence at the third instant and the animation instruction at a fourth instant.

9. The method according to claim 1, wherein determining the facial blended shape of the avatar animation based on the animation instruction vector comprises:

determining, by a facial expression generative adversarial network, the facial blended shape at a fifth instant based on emotional features at the fifth instant.

10. The method according to claim 9, wherein generating an avatar animation corresponding to the input text based on the animation sequence and the facial blended shape comprises:

generating the avatar animation at a sixth instant based on the animation sequence at the sixth instant and the facial blended shape at the sixth instant.

11. An electronic device, comprising:

at least one processor; and memory coupled to the at least one processor and having instructions stored therein, the instructions, when executed by the at least one processor, causing the electronic device to perform actions comprising:

generating an animation instruction vector for an avatar animation based on input text, by applying the input text to a large language model with a sparse attention mechanism, the large language model being configured to generate the animation instruction vector based on features of the input text;

determining an animation sequence of the avatar animation based on the animation instruction vector, the animation sequence indicating multiple frames of the avatar animation and transitions between the multiple frames;

determining a facial blended shape of the avatar animation based on the animation instruction vector, the facial blended shape indicating a facial expression of the avatar animation; and generating an avatar animation corresponding to the input text based on the animation sequence and the facial blended shape.

12. The electronic device according to claim 11, wherein generating an animation instruction vector for the avatar animation based on input text comprises:

determining an animation instruction at a second instant based on emotional features and contextual features at a first instant of the input text and the animation instruction at the first instant.

13. The electronic device according to claim 12, wherein determining an animation instruction at a second instant based on emotional features and contextual features at the first instant of the input text and the animation instruction at the first instant comprises:

determining, by the large language model with the sparse attention mechanism, emotional features and contextual features of the input text based on the input text; and determining the animation instruction based on the emotional features and the contextual features.

14. The electronic device according to claim 13, wherein determining the animation instruction based on the emotional features and the contextual features comprises:

determining, by a hard alignment mechanism, the animation instruction corresponding to the input text from a predefined animation instruction library based on the input text.

15. The electronic device according to claim 13, further comprising:

generating an animation instruction vector of the animation instructions based on a sequence-to-sequence of the large language model, the animation instructions in the animation instruction vector being arranged according to a time sequence.

16. The electronic device according to claim 13, wherein determining an animation sequence of the avatar animation based on the animation instruction vector comprises:

generating, by a cycle generative adversarial network with a sequence discriminator, a series of key frames based on the animation instruction vector; and interpolating between a first key frame and a second key frame among the series of key frames to generate the animation sequence.

17. The electronic device according to claim 16, further comprising:

adjusting the cycle generative adversarial network with a sequence discriminator based on a loss between real series of key frames and the generated series of key frames.

18. The electronic device according to claim 16, further comprising:

determining an animation sequence at a third instant based on the animation sequence at the third instant and the animation instruction at a fourth instant.

19. The electronic device according to claim 11, wherein determining the facial blended shape of the avatar animation based on the animation instruction vector comprises:

determining, by a facial expression generative adversarial network, the facial blended shape at a fifth instant based on emotional features at the fifth instant.

20. A computer program product comprising a non-transitory computer-readable medium storing machine-executable instructions which, when executed by a machine, cause the machine to perform actions comprising:

generating an animation instruction vector for an avatar animation based on input text, by applying the input text to a large language model with a sparse attention mechanism, the large language model being configured to generate the animation instruction vector based on features of the input text;

determining an animation sequence of the avatar animation based on the animation instruction vector, the animation sequence indicating multiple frames of the avatar animation and transitions between the multiple frames;

determining a facial blended shape of the avatar animation based on the animation instruction vector, the facial blended shape indicating a facial expression of the avatar animation; and generating an avatar animation corresponding to the input text based on the animation sequence and the facial blended shape.

* * * * *